United States Patent [19]
Sakai et al.

[11] Patent Number: 5,725,940
[45] Date of Patent: Mar. 10, 1998

[54] COMPOSITE MOLDED ARTICLE AND METHOD FOR MAKING SAME

[75] Inventors: Hideo Sakai; Kojiro Motai; Satoru Kishi; Katsuyuki Morita; Nobuyuki Hosoyama; Hiroshi Tanabe, all of Kanagawa-Ken; Shuji Iida, Mie-Ken; Kiyotaka Nakai, Aichi-Ken, all of Japan

[73] Assignee: Mitsui Toatsu Chemicals, Inc., Kariya, Japan

[21] Appl. No.: 141,602

[22] Filed: Oct. 27, 1993

[30] Foreign Application Priority Data

Oct. 27, 1992 [JP] Japan ..................... 4-288727
Oct. 27, 1992 [JP] Japan ..................... 4-310823

[51] Int. Cl.⁶ .................................... B32B 3/26
[52] U.S. Cl. .................. 428/318.6; 428/304.4; 428/306.6; 428/308.4; 428/318.4
[58] Field of Search ................. 428/295, 902, 428/311.1, 318.4, 318.6, 318.8, 304.4, 306.6, 308.4

[56] References Cited

U.S. PATENT DOCUMENTS

| 4,504,534 | 3/1985 | Adachi et al. |
| 5,098,778 | 3/1992 | Minnick ..................... 428/285 |

FOREIGN PATENT DOCUMENTS

| 393476 | 10/1990 | European Pat. Off. |
| 3626150 | 2/1988 | Germany. |
| 3644676 | 7/1988 | Germany. |
| 3722873 | 4/1989 | Germany. |
| 2-179724 | 7/1990 | Japan. |
| 489352 | 6/1970 | Switzerland. |

*Primary Examiner*—Richard Weisberger
*Attorney, Agent, or Firm*—Burns, Doane, Swecker & Mathis

[57] ABSTRACT

A composite molded article which is produced by joining multilayer boards composed of fiber-reinforced thermoplastic resin onto the surface of a core material made of a foamed resin, and its production method.

The composite molded article is constituted by a core material which is composed of a foamed resin molded into a desired shape, and the multilayer boards which are produced such that a plurality of prepregs containing reinforcement fiber by a volume content of not less than 30% and not more than 85% are laminated with the direction of the reinforcement fiber being different with respect to each other, and are heated to not less than a melting temperature of a thermoplastic resin contained therein so as to mutually glue the prepregs, and to remove air contained inside. When the composite molded article is produced, the multilayer boards having been molded into shapes adapted to a shape of the core material are heated to not less than the melting temperature of the thermoplastic resin and are pressed and glued to the core material to make the composite material article.

10 Claims, 7 Drawing Sheets

COMPOSITE MOLDED ARTICLE AND METHOD FOR MAKING SAME

BACKGROUND OF THE INVENTION

The present invention relates to a composite molded article which is produced by joining multilayer boards containing a fiber-reinforced thermoplastic resin onto the surface of a core material made of a foamed resin, and production process therefor.

Such composite molded articles are used for, for example, building materials such as scaffolding boards for construction, concrete mold form panels and the like, various mechanical parts such as interior materials and bumper beams for automobiles and the like, industrial materials and the like.

In the prior art, as a method for producing such a molded article, there is generally adopted a method in which multilayer boards produced by overlaying and joining thin fiber-reinforced boards made of resin are heated and softened, followed by applying a high pressure in a mold using a press machine to perform pressurizing and molding. One example of such methods is disclosed in an official gazette of a Japanese unexamined patent application, i.e. Japanese Patent Application Laid-open No. HEI-1-286823 (1989), titled "A continuous molding method of fiber-reinforced resin molded body and its molding apparatus".

However, the molding method disclosed in such official gazette is are a method for producing a simple molded article constituted by only such plastic boards, and this official gazette describes nothing for a composite molded article constituted by combining such boards with other raw materials.

On the other hand, as a structural member that is light weight and has high rigidity against bending, there is known a molded article having a so-called sandwich structure constituted by using a foamed article as a core material onto the surface of which boards as described above are attached.

Generally, when a composite structure is produced which is constituted by board portions containing reinforcement fibers and a core material portion composed of a foamed resin, it is necessary that both portions are separately produced, and they are glued with an adhesive or by a heat welding method, or joined using mechanical fasteners.

Such methods have problems that not only the equipment cost for molds and the like is expensive due to separate production of both portions, but also the production cost is high due to complicated steps.

Especially, there are such problems that when mechanical joining members such as bolts, nuts and the like are used, mechanical processing such as tapping and the like and assembly steps are necessary, so that it takes a long time for production in any case, and the cost becomes expensive, and further when joined molded articles are used as structural framework members, the stress is concentrated on mechanically joined portions such as bolts, nuts and the like, so that various reinforcements such as stays and ribs are required.

There have been such problems that when joining is chemically made using an adhesive agent, such steps are required that the adhesive agent is applied to multilayer boards molded in accordance with an outer shape of a core material, to make contact between them by pressure and maintain the contact until solidification of the adhesive is completed, so that it takes a long time for production, the cost becomes expensive, and the joined plane is apt to suffer troubles such as boundary peeling and the like.

In addition, especially in recent years, polypropylene resin has been used for the boards and the core material, however, there is such a problem that when both portions are made from the polypropylene resin, there is no suitable adhesive agent, and hence adhesion has to be made by the heat welding method in such a case, however, there are such problems that when the plastic boards having been already molded are heated using hot plates from the exterior, the surface of the boards becomes rough, and when the boards at a high temperature are pressed against the core material composed of foamed resin for the purpose of adhesion, the core material is crushed.

Thus, in the prior art, it has been rare to use thermoplastic resins as a material for both portions, but reactive type thermosetting resins have been mainly used. However, when a thermosetting resin is used, there is such a problem that large scale production equipments are required, and thus the cost is expensive.

On the other hand, in these days, for example, in order to attain light weight automobiles, it has been attempted to replace parts made of iron steel with those made of reinforced plastic, and for example, as disclosed in Japanese Patent Application Laid-open No. SHO-62-128732 (1987), bumper beams made of steel which have been hitherto widely used are replaced by a bumper beam made of reinforced plastic.

This bumper beam is constructed by the following steps in which a pair of groove-shaped long beams having a U-shaped cross-section with a wide lateral width and a shallow groove and flange portions provided along longitudinal edge sides are produced using reinforced plastic, their flange portions are opposed with each other, polypropylene sheets are interposed therebetween so as to make welding by a heating welding, vibration welding or electromagnetic induction welding method to give a beam of a hollow angular tube shape having a rectangular cross-section, a thick shock absorbing body made of foamed polypropylene is attached to its front face, and its outside is covered with a surface material having a U-shaped cross-section.

With this known bumper beam, the reinforced plastic is not combined organically and integrally, the foamed article is used only for the purpose of shock absorption, and the structural member for receiving shock load is constituted only by the reinforced plastic.

Thus, this known bumper beam is relatively bulky, which does not harmonize with designs of automobile bodies.

If the reinforced plastic and the formed body are composited organically and integrally to constitute a bumper beam, an extremely slim bumper beam having a strong buffer function can be obtained, however, such a technical concept is not shown in these cited references.

SUMMARY OF THE INVENTION

A main object of the present invention is to provide a method for obtaining a composite molded article in which multilayer boards composed of a fiber-reinforced thermoplastic resin and a core material composed of a foamed resin may be tightly joined together under a low adhesion pressure without using mechanical fasteners such as bolts, nuts and the like or an adhesive agent and the like.

Another object of the present invention is to provide a novel composite molded article that is light weight and has high stiffness at an inexpensive price and can be prepared in a large amount.

Still another object of the present invention is to provide a novel bumper beam made of plastic for automobiles having the structure and the feature as described above.

The above-mentioned objects of the present invention are achieved by mutually melting, incorporating and solidifying joint portions between the thermoplastic resin contained in the multilayer boards and the foamed resin itself constituting the core material so as to join the core material to the multilayer boards without using an adhesive agent.

In the method of the present invention, the multilayer boards themselves to be joined to the core material are utilized as heating plates for adhesion, and thus extremely good adhesion is achieved.

The above-mentioned multilayer board, preferably contains a reinforcement fiber which is desirably glass fiber having a volume content of not less than 30% and not more than 85%. In addition, it is desirable that both of the thermoplastic resin contained in the multilayer boards and the resin for constituting the core material are polypropylene resin.

Thus, the method of the present invention for making the above-mentioned laminated molded article is characterized by comprising;

a step in which a foamed resin is used to produce a core material having a desired outer shape, a step in which a plurality of prepregs containing reinforcement fibers of a volume content of not less than 30% and not more than 85% are laminated with its direction of the reinforcement fibers be changed to each other, and heated to not less than a melting temperature of a thermoplastic resin contained therein so as to mutually join the prepregs, and air contained inside is removed to produce multilayer boards, a step in which the multilayer boards are heated to not less than the melting temperature of the thermoplastic resin, and molded and processed into shapes adapting to the shape of the core material, a step in which the multilayer boards having been molded into the desired shapes are arranged in the vicinity of the core material, contacted with desired regions, pressure-joined to the core material at a low pressure, and joined to make integration, and a step in which a composite molded article constituted by the core material and the multilayer boards is cooled, and the resins are cured.

Incidentally, although there is no limitation thereto, the above-mentioned method can be successfully carried out especially when the reinforcement fiber of the multilayer board is glass fiber, the thermoplastic resin contained therein is a polypropylene resin, and the above-mentioned core material is constituted by foamed polypropylene.

Further, the composite molded article according to the present invention can have a decoration material which is joined to the surface of the multilayer boards joined to the core material.

When this decoration material is made of a synthetic resin, the joining between the multilayer board and the decoration material also can be mutually performed without an adhesive agent by melting, incorporation and solidification of the resins themselves as the components thereof at the joining portion.

In addition, when this decoration material is an organic or inorganic fiber product, both parties may be strongly glued by solidifying the thermoplastic resin in a state in which the fiber of the decoration material is embedded into the melted thermoplastic resin of the multilayer board, or inversely the melted thermoplastic resin is soaked between the fibers of the decoration material.

The foamed resin used in the present invention preferably has its expansion factor of 2- to 50-fold, and it is recommended to use a resin of the same type as that of the resin for constituting other elements.

As the multilayer board used in the present invention, a unidirectional fiber-reinforced thermoplastic resin plate (hereinafter referred to as the prepreg), in which a fiber sheet constituted by stretching and aligning long continuous fibers in one direction on one plane is used as a framework material into which the thermoplastic resin is impregnated, is used. As the prepreg, other than the above, a multidirectional fiber-reinforced thermoplastic resin plate, in which the above-mentioned resin is impregnated into a woven fabric composed of such fiber, is known, and it is also possible to use such a prepreg.

These prepregs may be used alone, however, usually a plurality of the prepregs are laminated to give a desired thickness with variously combining directions of the fiber, which are heated and compressed beforehand to remove air existing between the prepregs, and molded into a desired shape and size to be used.

As the prepreg, any one which usually contains the above-mentioned fiber by 30–85% by volume and has its thickness of 0.05–1.0 mm can be used, however, especially one which is produced by a method disclosed in U.S. Pat. No. 5,201,979 is recommended.

One sheet of the multilayer board comprises up to 100 sheets of the prepregs at the maximum.

One of the features of the present invention is to use the multilayer board composed of such prepregs.

Even when the multilayer boards comprise a large number of the prepregs, the resin layers exist between the fiber layers which form the prepreg, and when they are in a melted state, the shearing movement between the fiber layers becomes easy owing to their lubricating function, so that it is possible to deform them into a shape adapted to an outer shape of the core material to which they are stuck by pressing and contacting to the core material or a mold under such a low pressure of a degree that the foamed resin is not crushed by pressure.

In addition, the multilayer board composed of one or a few number of the prepregs may be deformed by extremely small external force when it is heated to a melting temperature of the resin.

This is an effect owing to the fact that the continuous fibers are aligned in one direction or two longitudinal and lateral directions on one plane.

Even in the case of the multilayer board having the same thickness, its characteristics may be changed depending on a combination of the thickness of one prepreg to be used and the number of the sheets to be laminated, however, in summary, any one of those which can be deformed into an optional shape by a low pressure of a degree of several kg/cm$^2$ can be used to carry out the present invention.

In the case of a conventional fiber-reinforced resin plate, long continuous fibers of helical shapes are intertwined with each other, into which the resin is impregnated, and further the plate thickness is also usually not less than 3 mm, so that when it is deformed, it is necessary to make deformation with widening the mass of intertwined fibers, and thus a fairly high pressure is required, it is impossible to make deformation by pressing against the core material, and it is necessary to perform molding at a high pressure even when a mold is used.

As the fiber to serve as the framework material of the prepreg, for example, there can be exemplified inorganic fiber such as glass, carbon, silicon carbide and the like, metallic fiber such as titanium, boron, stainless steel and the like, and synthetic resin fiber such as aramid (trade mark "KEVLAR" and the like).

As the prepreg, one, in which fiber strands obtained by stranding 200–2000 monofilaments usually having a diameter of 3–25 μm or twisted yarns are mutually aligned in parallel using a predetermined number of individuals into which the thermoplastic resin is impregnated, is used.

In order to improve the close contact property with the resin, the glass fiber is applied with a known surface treatment using a binder and a coupling agent.

Namely, in order to collect or strand the monofilaments, it is necessary to apply the treatment by using the binder suitable for the thermoplastic resin to be combined. Generally, one, which softens at a melting temperature of the resin to be combined and makes it easy for the thermoplastic resin to be impregnated into the fiber strand, is selected. Therefore, the binder, which contains a resin of the same type of that of the thermoplastic resin to be combined as a main component, is often used.

As the glass fiber, one, which is treated with the coupling agent such as silane, titanate, zirconium and the like to improve the close contact property with the resin, is used. With respect to the coupling agent to be used in this case, it is necessary to select the most suitable one depending on the resin to be combined, and concrete examples thereof will be exemplified as follows.

For nylon: there are γ-aminopropyltrimethoxysilane, N-β-(aminoethyl)-γ-aminopropyltrimethoxysilane and the like.

For polycarbonate: there are γ-aminopropyltrimethoxysilane, N-β-(aminoethyl)-γ-aminopropyltrimethoxysilane and the like.

For polyethylene terephthalate or polybutylene terephthalate: there are β-(3,4-epoxycyclohexyl) ethyltrimethoxysilane, γ-glycidoxypropyltrimethoxysilane, γ-aminopropyltrimethoxysilane and the like.

For polyethylene or polypropylene: there are vinyltrimethoxysilane, vinyl-tris-(2-methoxyethoxy)silane, γ-methacryloxypropyltrimethoxysilane and the like.

For polyphenylene oxide, polyphenylene sulfide, polysulfone, polyether sulfone, polyether ketone, polyether etherketone, polyimide, polyallylate, and fluororesin: the above-mentioned coupling agents can be of course used, however, other than the above, there are N-β-(aminoethyl)-γ-aminopropylmethydimethoxy silane, γ-chloropropylmethyldimethoxysilane, γ-mercaptopropyltrimethoxysilane, p-aminophenyltriethoxysilane and the like.

When a fiber other than glass fiber is used as the reinforcement fiber, the treatment is often performed using an epoxy resin of the amine curing type as the coupling agent, wherein concrete examples of the epoxy resin can be exemplified by bisphenol-A-epichlorohydrin resin, epoxy novolak resin, alicyclic epoxy resin, aliphatic epoxy resin, and glycidyl ester resin.

However, the thermoplastic resin generally has a high melting temperature, so that when the above-mentioned coupling agents may suffer thermal decomposition, such coupling agents can not be used.

A method for applying the coupling agent onto the fiber surface is as follows.

Namely, as one method, when the fiber is melted to draw out the monofilaments, the binder and the coupling agent are added with a surface active agent to make an aqueous solution which is sprayed onto the monofilaments followed by drying at a temperature of about 100° C.

As an alternative method, a solution in which the binder and the coupling agent are dissolved by 0.1–3% by weight in total is impregnated into the fiber from which the binder is removed, by means of immersing, spraying, application and the like.

The fiber containing the coupling agent solution is dried at 60°–120° C., and the coupling agent is allowed to react with the fiber surface. For the drying time, a time required for the solvent to evaporate and dissipate is sufficient, which is usually about 15–20 minutes.

With respect to the solvent in which the coupling agent is dissolved, depending on the surface treating agent used, there is a case in which water adjusted to have a pH of about 2.0–12.0 is used, and there is a case in which organic solvents such as ethanol, toluene-acetone, xylene and the like are used alone or after mixing.

There are various means for the method for impregnating the thermoplastic resin into the reinforcement fibers stretched and aligned in one direction on one plane so as to make the shape of sheet, however, the most general method is as follows.

In the case of the resin which is soluble in the solvent, it is possible to adopt a method in which the resin is dissolved in the solvent and impregnated into the reinforcement fiber, and then the solvent is removed with deaeration so as to make the sheet.

As an alternative method, a method, in which the resin is heated and melted to impregnate into the reinforcement fiber, which is deaerated and cooled to make the sheet, is also known.

The prepreg thus produced is excellent in the close contact property between the fiber and the thermoplastic resin, the fiber content can be also widely changed to be 30–85% by volume in accordance with demands, and the thickness can be also in a range of 0.05–1.0 mm to easily produce those having a desired thickness.

If the glass fiber content is not more than 30% by volume, the amount of fiber becomes too small and the strength becomes insufficient, while if it is not less than 85% by volume, the amount of resin becomes too small with respect to the fiber, the close contact property between the fiber and the resin is lowered, and the strength also is lowered.

On the other hand, as the thermoplastic resin to be impregnated between the framework material fibers, for example, there are exemplified polystyrene, polyvinyl chloride, high density polyethylene, polypropylene, polycarbonate, polybutylene terephthalate, polyethylene terephthalate, polyether sulfure, polysulfone, polyether imide (trade mark "ULTEM"), polyether etherketone, polyphenylene sulfide and the like.

In addition, as the foamed resin to be used for the core material, for example, in addition to polypropylene, polyurethane and the like, it is possible to utilize one in which the core material composed of foamed polystyrene is coated with foamed polypropylene. Those having an expansion factor of 2-fold to 50-fold can be used.

As the decoration material, for example, in addition to polypropylene thermoplastic resin products and the like such as sheets of foamed or nonfoamed polystyrene, PVC, PZT and the like, those having fiber appearing at the surface such as woven fabric, nonwoven fabric, hides and the like are desirable.

When the composite molded article according to the present invention is produced, at first multilayer boards are heated, a purpose of which is to sufficiently perform deaeration between the prepregs and give sufficient heat to the multilayer boards to make processing in the next step easy.

Generally, when a thermoplastic resin plate containing no reinforcement fiber is heated to not less than a melting temperature, it becomes impossible to maintain its shape, and it becomes difficult to mold it into a desired shape.

Therefore, in such a case, molding is performed within a closed mold, or molding is performed within a softening range not more than the melting point of the thermoplastic resin.

However, in a case of the multilayer board to be used in the present invention, the resin is held by the organization constituted by a large number of fibers, so that there is no outflow even when the thermoplastic resin melts to be in a state capable of fluidization, and thus it is possible to keep the board in a desired shape, and hence it is possible in the next step to press the multilayer board heated to not less than the melting point of the resin contained therein against the surface of the core material as a partner to be joined, so as to make close contact with it and provide integration.

In the method of the present invention, even after the multilayer board is molded into a shape to closely contact with the surface of the core material, its thermoplastic resin maintains the melting state, so that the surface layer of the foamed resin which constitutes the core material is melted by heat supplied therefrom and welded to the multilayer board, and hence immediate cooling and solidification in this state provides strong joining between both portions.

In this case, when edge side portions of a plurality of the multilayer boards for wrapping the core material overlap with each other, the thermoplastic resins at the joining plane are welded with each other if they are pressed and joined together during a period in which they are at a high temperature, so that immediate cooling and solidification thereof also provides complete mutual joining with a high strength among the plurality of multilayer boards wrapping the core material, resulting in an integrated structure.

Further, when the multilayer boards are joined to the core material, if the decoration material is simultaneously closely contacted with the outer surface of the multilayer board, then the decoration material receives heat from the multilayer board at a high temperature, and its joining face is melted and fused to the multilayer board.

In addition, even when the decoration material is not melted at the temperature of the multilayer board, if it is porous or fuzzy such as for example textiles and the like, then there is given a state in which the melted resin is impregnated into the fiber and weave pattern, or thin fibers and the like extending from the decoration material stab the melted resin layer of the multilayer board, so that cooling and solidification thereof can provide integration of the multilayer board and the decoration material.

Thus, with respect to the multilayer board composed of said prepregs, if the volume content of the fiber is less than 30%, it becomes impossible to perform suitable molding due to the decrease in ability to prevent fluidization of the resin, while inversely if the volume content of the fiber exceeds 85%, the resin content becomes small, and molding becomes difficult, so that no desirable molded article is obtained.

Namely, in the preset invention, the multilayer board containing fiber by not less than 30% and not more than 85% in the volume content is used. More desirably, the multilayer board having a volume content of fiber of 40–80% is especially recommended due to its good molding processing properties to thus obtain desirable molded articles.

Generally when the foamed resin receives a high pressure, it is largely deformed and crushed by pressure. In addition, when the heated multilayer board is compressed by applying a high pressure for molding, the melted resin flows and disappears from the three-dimensional structure of the fiber except for a case in which the pressure is applied in a tightly closed mold. Thus, generally the molding pressure must be suitably selected considering the temperature and viscosity of the resin and the compressive strength of the foamed resin. A pressure of not less than 10 kg/cm$^2$ has been usually required in the case of using a conventional system, however, the molding pressure for the multilayer board to be used in the method of the present invention is sufficient to be not more than 3 kg/cm$^2$, usually about 0.1–1.5 kg/cm$^2$.

When the resin contained in the multilayer board is different from the resin for constituting the core material, possible combinations thereof may be described such that it is desirable that the melting point of the former is approximately the same as or not more than the melting point of the latter.

When the melting points of both portions are approximately the same, the resins of both portions are advantageously melted and integrated when the heated multilayer board contacts the core material.

However, even if the resin of the core material has a high melting point and there is no melting, when the melted resin of the multilayer board flows into cells existing at the surface of the porous core material, and is solidified, both portions are joined sufficiently strongly, so that there is no trouble. On the contrary, it is inconvenient that the melting point of the core material resin is too low.

In addition, of course, it is impossible to adopt a combination of resins such that one resin decomposes at a melting point of the other resin.

Describing the heating of the multilayer board, when the multilayer board composed of glass fiber having a volume ratio of 60% and the remainder of polypropylene is used, it is recommended to heat it using an oven at 250° C. With respect to the heating time, about 1 minute in the case of about 1 mm of the thickness of the board, or about 3 minutes in the case of about 3 mm are sufficient.

As one composite molded article according to the present invention, a bumper for automobiles can be exemplified.

A main beam of the bumper according to the present invention is constituted by a long main member of a groove-shaped cross-section having flanges extending outwardly at its edge sides, a core material composed of a foamed resin filled in the groove of the main member, and a connection plate for covering the core material and connecting the flanges of the main member.

Thus, the bumper comprises the main beam, bumper stays for attaching it to a vehicle body, a cushion member composed of a foamed resin to be attached to the outer face of the main beam, and a cover element for covering them.

DESCRIPTION OF THE PREFERRED EMBODIMENTS

Preferred embodiments of the present invention will be explained hereinafter with reference to the drawings.

Figure 1:
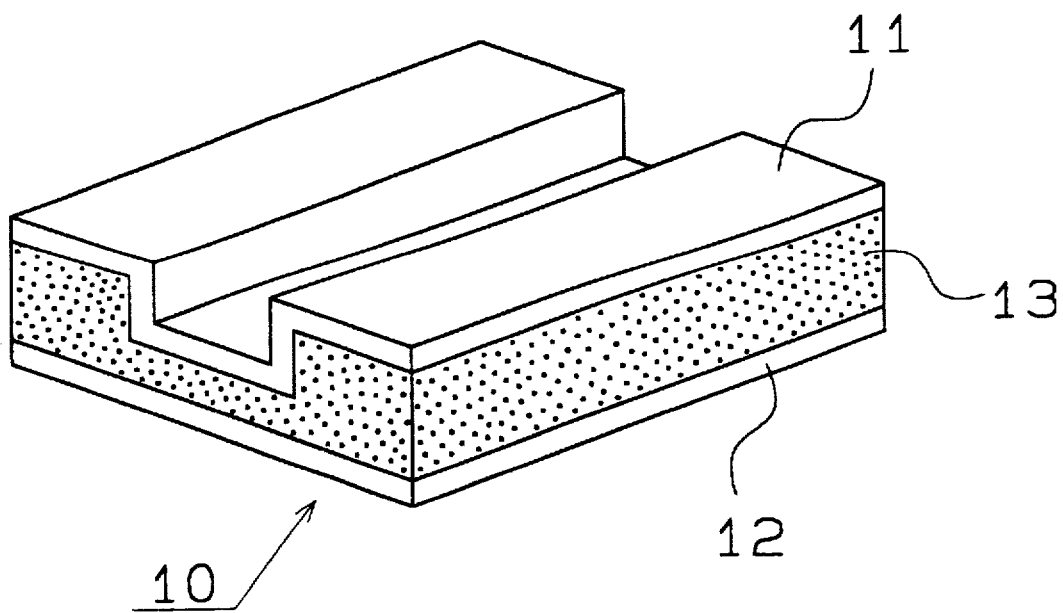
FIG. 1 is a perspective view showing one example of a laminated composite molded article according to the present invention.

FIG. 1 is a perspective view showing one example of the basic structure of a laminated composite molded article according to the present invention, wherein 10 is the molded article according to the present invention, 11 and 12 are multilayer boards, and 13 is a core material composed of a foamed resin.

Figure 2:
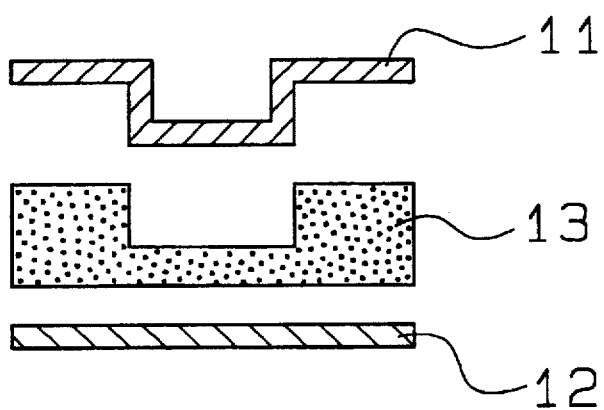
FIG. 2 is a cross-sectional view showing multilayer boards arranged over and under a core material composed of a foamed resin, heated and molded during the process for producing a laminated composite molded article according to the present invention.

Thus, the multilayer boards 11 and 12 are previously heated and compressed, and air contained between prepregs constituting them is removed, which are molded into cross-sectional shapes as shown in FIG. 2.

The core material 13 is molded by foaming a resin within a desired mold, both upper and lower faces of which are joined to the multilayer boards 11 and 12 respectively to produce the composite molded article 10.

Air existing between the prepregs is previously excluded in a heating step before contacting the core material 13 with the multilayer boards 11 and 12, which are heated up to a temperature sufficient to melt the resin contained in themselves and the core material resin, that is usually up to a temperature of not less than the melting point of the resin.

Even when the multilayer boards are heated to not less than the melting point of the resin contained therein, they can be molded into desired shapes because the resin is held between fibers as described above and hence the resin is not fluidized.

Figure 3:
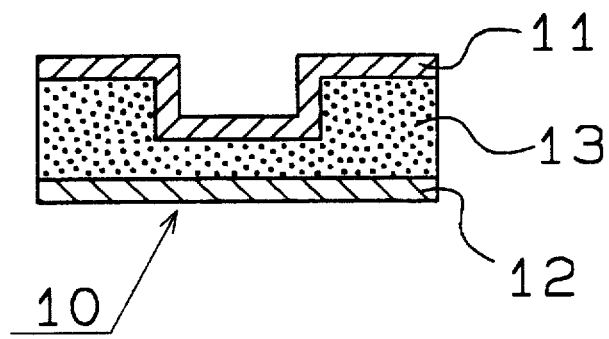
FIG. 3 is a cross-sectional view of the composite molded article obtained by closely contacting the multilayer boards shown in FIG. 2 with the core material, followed by cooling and solidification to make integration.

Thus, as shown in FIG. 3, when the multilayer boards 11, 12 are closely contacted with the core material 13, the resin at the surface of the core material 13 is melted by heat possessed by the multilayer boards 11, 12. Namely, the multilayer boards 11, 12 function as heating plates for heat adhesion, so as to melt the resin at the surface of the core material 13.

The fiber contained in the multilayer boards 11, 12 functions as an accumulator, and owing to the quantity of heat accumulated therein, the surface of the resin constituting the core material 13 melts, which is integrated with the melted resin contained in the multilayer boards, so that immediate cooling thereof results in an excellent composite molded article in a short time. In this case, since the resin is thermoplastic, the time which is necessary for a polymerization reaction as in a thermosetting type epoxy resin is not required, and an extremely short processing time is sufficient.

Figure 4:
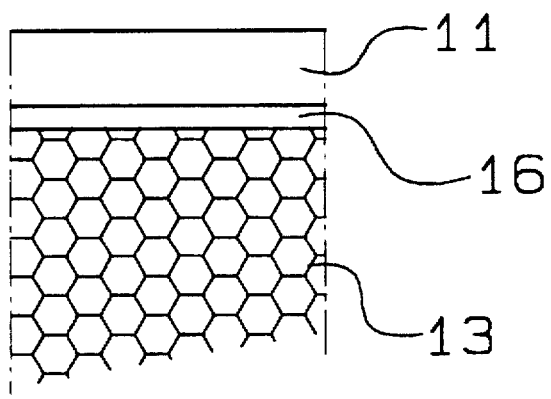
FIG. 4 is a partially enlarged cross-sectional view showing details of a joining portion between the multilayer boards and the core material of the composite molded article shown in FIG. 3.

The state of a joined portion between the multilayer board and the core material is enlarged and shown in FIG. 4. According to microscopic investigation, it is observed that a welded layer 16 is formed at a joined plane between the multilayer board 11 and the core material 13. When their resins are the same resin, there is given a configuration in which a thin film is formed at the surface layer of the foamed resin of the core material 13. On the other hand, when both portions are composed of different resins, the welded layer 16 becomes a composition in which the both resins exist in a mixed state.

Figure 5:
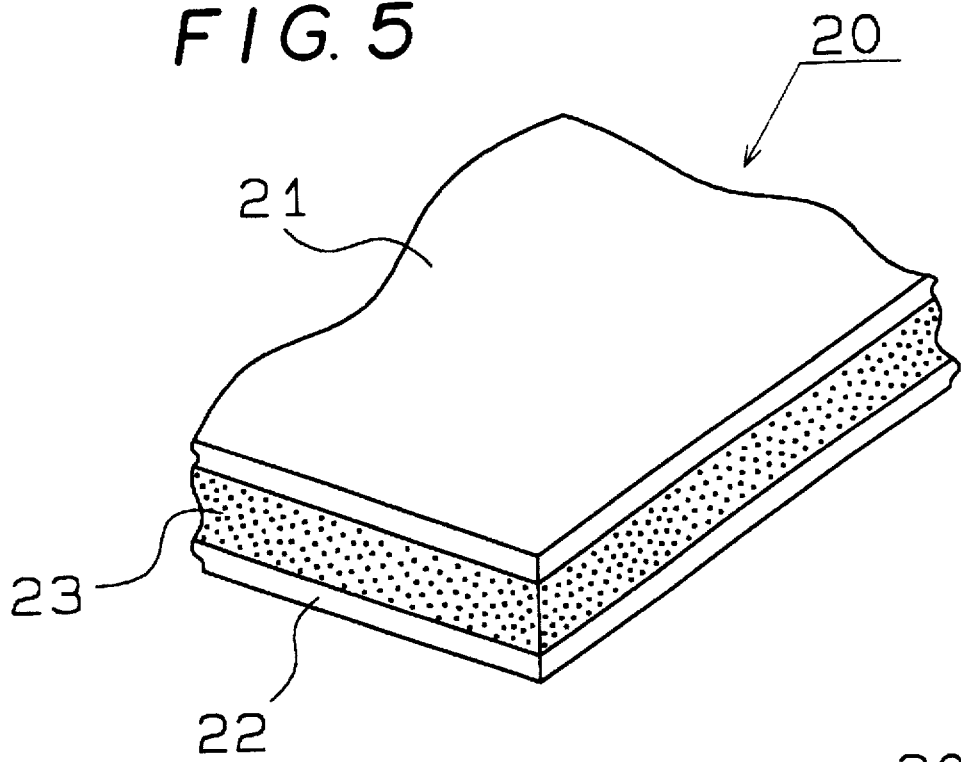
FIG. 5 is a partially broken perspective view showing a partial structure of the second example produced by the method of the present invention.

A composite molded article 20 shown in FIG. 5 has a simple flat plate shape, which includes multilayer boards 21 and 22 and a core material 23. In the figure, in order to enlarge and show a cross-sectional structure, only one portion is shown, however, actually this molded article 20 is a board having a size of, for example, 1800 mm×3600 mm×10 mm or more.

Figure 6:
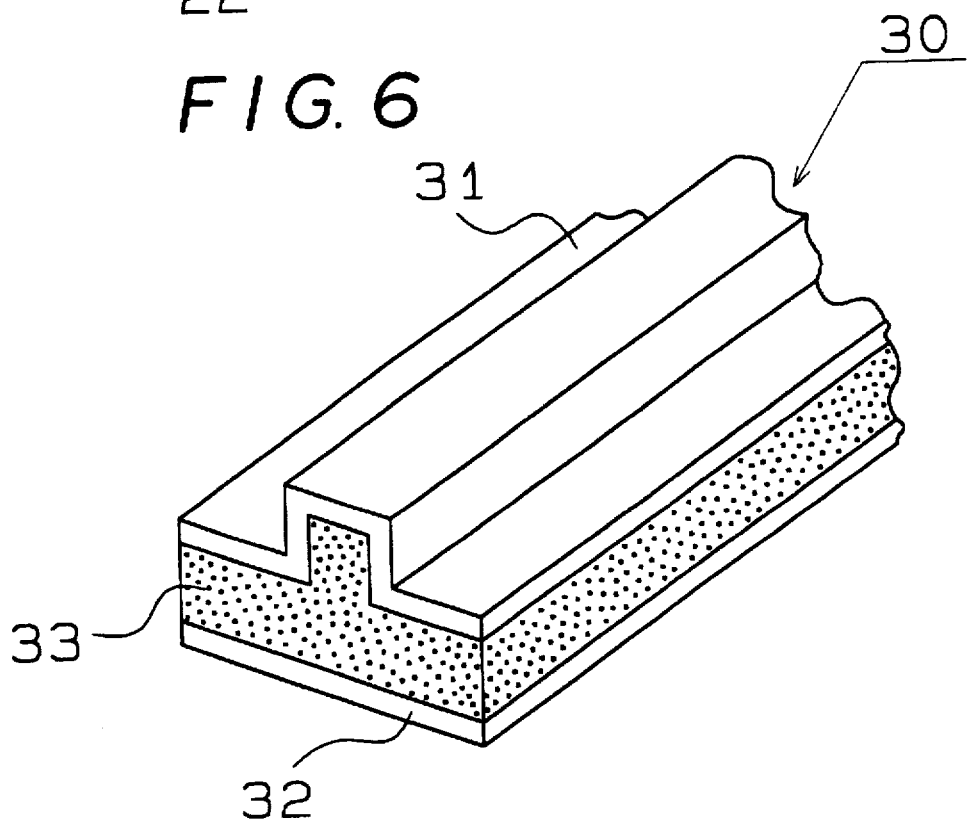
FIG. 6 is a partially broken perspective view showing a partial structure of the third example obtained by the method of the present invention.

A composite molded article 30 shown in FIG. 6 has a long dimension having a convex strip on one surface, which is constituted by multilayer boards 31 and 32 and a core material 33.

These molded articles which are shown in FIG. 1, FIG. 5 and FIG. 6 are produced, for example, as follows.

At first, a desired foamed resin, for example, a foamed polypropylene resin is used to prepare the core material having a desired shape, respectively.

Separately therefrom, a plurality of prepregs, which are produced by impregnating a polypropylene resin into glass fibers aligned in one direction on one plane, are laminated so that the arrangement directions of the fibers in the mutually adjoining prepregs make a right angle, so as to prepare two sheets of the multilayer boards having a thickness of 0.2 mm and a volume content of fiber of 60%.

Release films composed of polyimide or polytetrachloroethylene are stuck onto both faces of these multilayer boards, which are interposed between plates heated to 250° C. and heated for 5 minutes under a pressure of 0.01–0.03 kg/cm².

After the heating, the release films on the first faces are peeled off from the two multilayer boards respectively, the core material previously prepared are interposed therebetween and are placed into a press mold preheated to 60° C. to cool with applying a pressure of 2 kg/cm². The mold is opened after being cooled to not more than the melting point of the resin, the molded article is taken out, and the release films are peeled off.

In any case, a mold capable of molding the aimed molded article is used.

Figure 7:
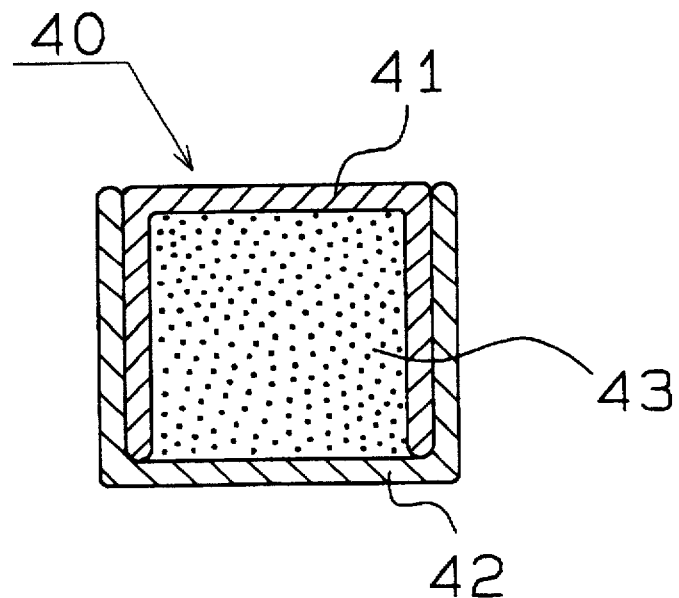
FIG. 7 is a lateral cross-sectional view showing the structure of the fourth example according to the present invention.

FIG. 7 shows a cross-section of a molded article 40 having a long square pole shape.

This molded article is produced, for example, as follows.

At first, a desired foamed resin, for example, a foamed polypropylene resin is used to prepare a square pole-shaped core material having a desired dimension.

Separately therefrom, eight sheets of prepregs composed of glass fiber and a polypropylene resin in the same manner as describe above are laminated so that the arrangement directions of the fibers in the mutually adjoining prepregs make a right angle, so as to prepare two sheets of multilayer bards having a thickness of 0.2 mm and a volume content of fiber of 60%.

Release films composed of polytetrachloroethylene are stuck onto both faces of these multilayer boards, which are interposed between plates heated to 250° C., and heated for 5 minutes under a pressure of 0.01 kg/cm².

After the heating, the release films on the first faces are peeled off from the two multilayer boards respectively, one multilayer board 42 is placed on a horizontal pedestal, the above-mentioned core material 43 is placed on its center line, the remaining multilayer board 41 is further placed thereon with adjusting the center line, and next protruding portions at both sides of the upper multilayer board 41 hang downward along side faces of the core material 43, so that they are pressed against the side faces of the core material 43, the release film on the multilayer board 41 is peeled off, and then the multilayer board 42 is wound with inverting upside down, which is pressed against the core material 43 and the other multilayer board 41 to be joined by pressure, and cooling is performed to peel off the release film, resulting in the molded article.

FIG. 7 shows a cross-sectional view of a molded article 40 having a long square pole shape.

The multilayer board is crimped to prepare gutter shaped members 41 and 42 of box like cross-section, which are sufficiently heated. At this state, a long square pole shaped core material made of foamed resin is pushed into the member 41 and the member 42 is covered over the member 41 and the core material 43, and the above three members 41, 42 and 43 are closely joined at their adjoining surfaces and are cooled to thus obtain a long square pole shaped molded article 40.

Figure 8:
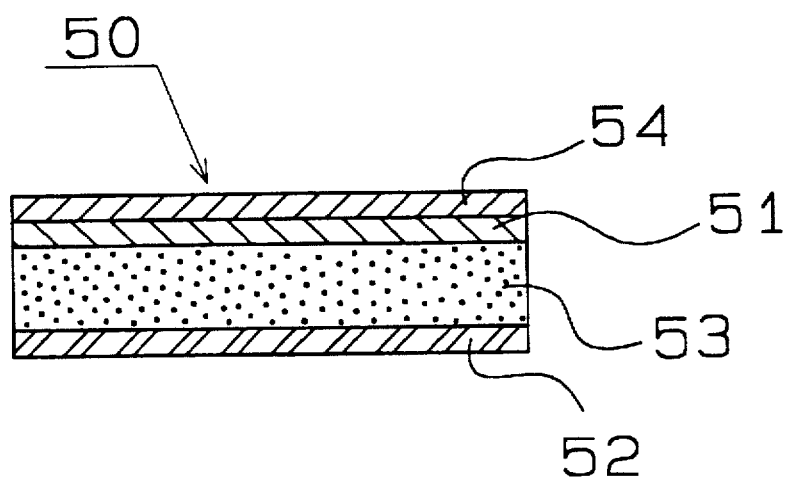
FIG. 8 is a lateral cross-sectional view showing the structure of the fifth example according to the present invention.

FIG. 8 shows a cross-sectional structure of a composite molded article 50 further using a decoration material 54 in addition to multilayer boards 51, 52 and a core material 53.

This composite molded article 50 is constructed by closely contacting the multilayer boards 51 and 52 with both front and back faces of the core material 53, and closely contacting the decoration material 54 with the surface of one multilayer board 51.

Figure 9:
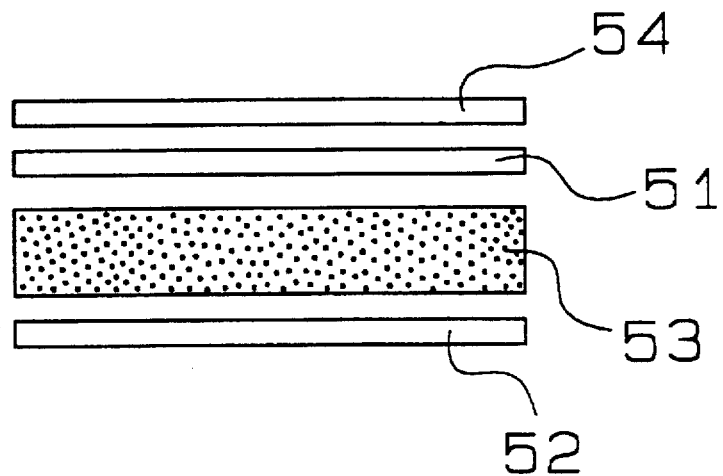
FIG. 9 is an explanatory view showing a state in which multilayer boards and a decoration material are arranged over and under a core material in order to produce the composite molded article shown in FIG. 8.

In order to produce it, as shown in FIG. 9, the multilayer boards 51 and 52 having been heated, compressed, deaerated and optionally molded into desired shapes are arranged over and under the core material 53 having been molded into a desired shape, and further the decoration material 54 is overlaid onto the multilayer board 51 at the upper side in the figure, which is slightly pressed and contacted.

In the meantime, the surface portions of the core material 53 and the decoration material 54 contacting the multilayer boards 51 and 52 at a high temperature are melted by heat of the multilayer boards 51 and 52, and welded to the multilayer boards 51 and 52, so that when they are cooled and solidified, the composite molded article having the decoration material as shown in FIG. 8 is obtained.

Figure 10:
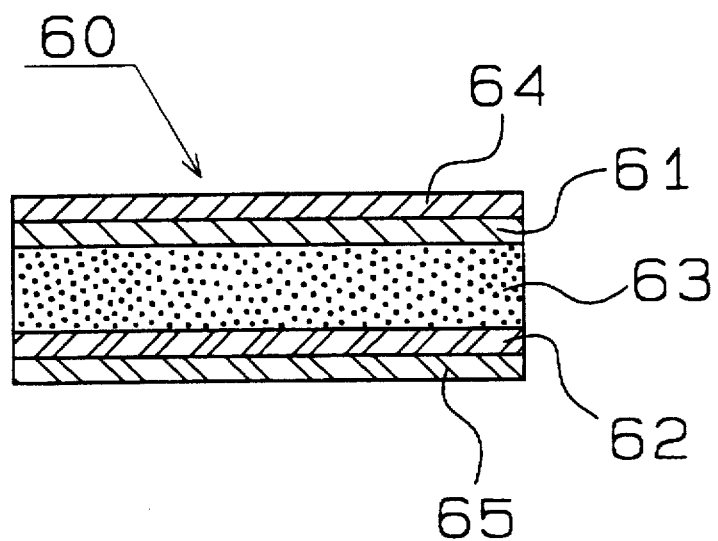
FIG. 10 is a lateral cross-sectional view showing the structure of the sixth example according to the present invention.

A composite molded article 60 shown in FIG. 10 is constructed by sticking multilayer boards 61 and 62 onto the front and back of a core material 63 respectively, and further sticking decoration materials 64 and 65 onto both front and back faces thereof.

The molded articles shown in FIG. 8 and FIG. 10 are produced by, for example, a method similar to that shown in the above-mentioned FIG. 1 and the like, however, they are provided with the decoration material, so that before placing them in the press, the release film on the face to which the decoration material is stuck is removed, and the desired decoration material is overlaid, after which they are placed in the press, and cooled under a pressure on the order of about 3 kg/cm². As the multilayer board used, for example, one having a glass content of 50% by volume and a thickness of about 0.25 mm is recommended.

Figure 11:
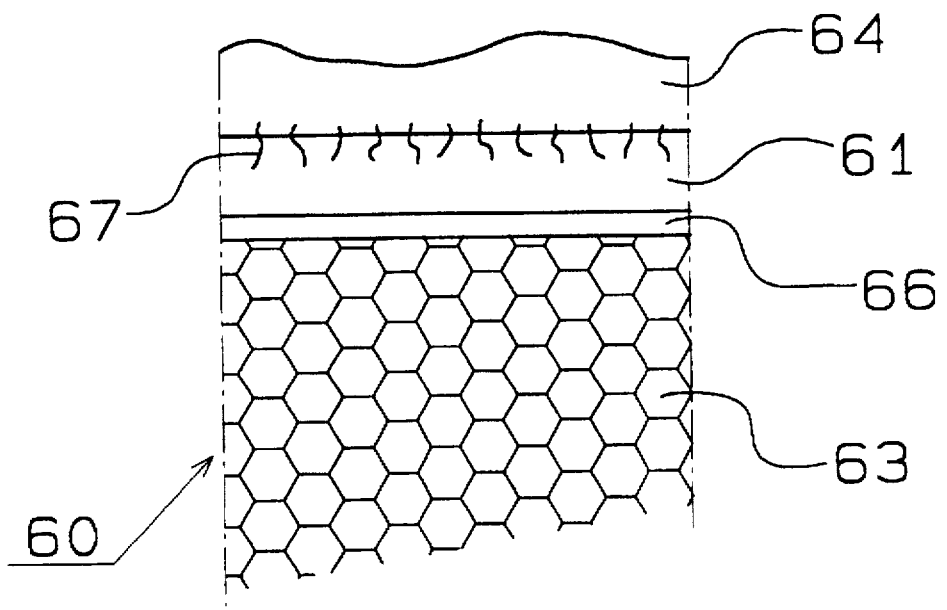
FIG. 11 is a partially enlarged cross-sectional view showing details of a joining portion of the sixth example shown in FIG. 10.

FIG. 11 is an explanatory view of details of the joint portion between the decoration material 64 and the multilayer board 61 and the joint portion between the multilayer board 61 and the core material 63 when a fuzzy material is used as the decoration material 64 in the example shown in FIG. 10.

The joint portion 66 between the multilayer board 61 and the core material 63 is similar to the joint portion 16 shown in FIG. 4, which is generated by melting and mixing the resins contained in the multilayer board 61 and the core material 63.

However, the decoration material 64 is generally woven fabric, hide or the like, which is not usually melted by the heat of the multilayer board, so that the joint portion as in between the multilayer board 61 and the core material 63 is not generated.

Instead thereof, the decoration material 64 has a fuzzy surface at the joining portion between the decoration material 64 and the multilayer board 61, so that fibers 67 protruding from the surface stab into the melted resin of the multilayer board, and the resin solidifies as it is, so that owing to an anchor function thereof, the decoration material is mechanically and strongly connected to the multilayer board. Thus, the decoration material is not necessarily limited to only resins of the type to be melted by heat only, but it is possible to select those produced by using various raw materials such as woven fabric, nonwoven fabric, glass cloth, asbestos, inorganic materials and the like.

Figure 12:
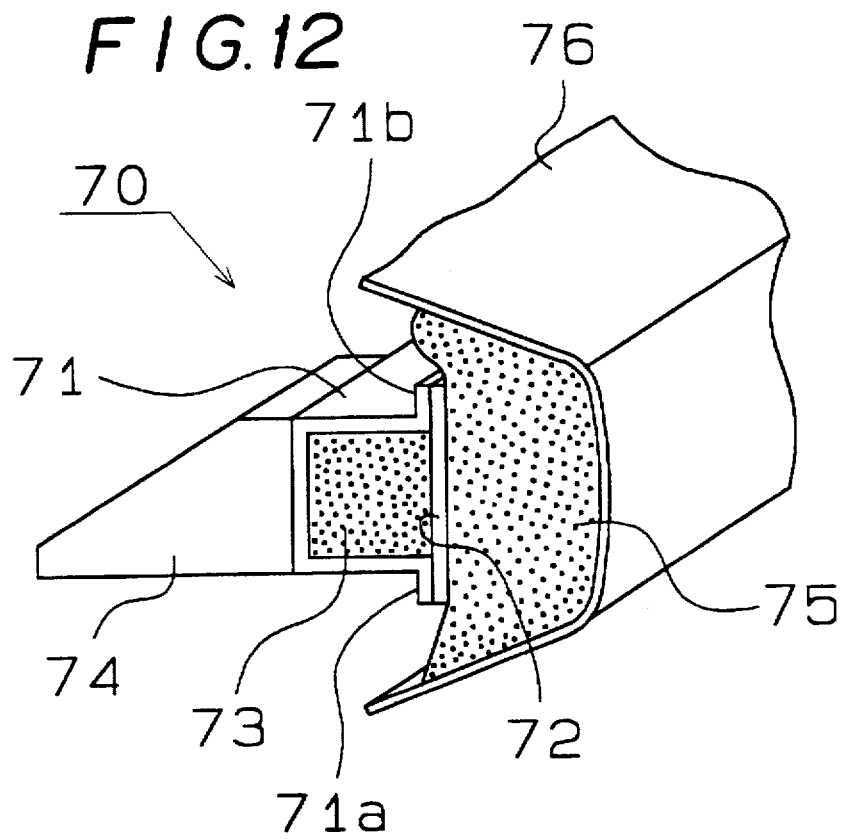
FIG. 12 is a partially broken perspective view showing details of a bumper beam according to the present invention.

A bumper 70 shown in FIG. 12 will be explained.

This bumper 70 has a bumper beam which is constituted by a main beam 71 of a groove-shaped cross-section constituted by molding multilayer boards, a front plate 72, and a core material 73.

The main beam 71 is a long beam of a groove-shaped cross-section having a pair of flanges 71a, 71b projecting sideward outwardly along both edge sides extending in its longitudinal direction respectively, which has a pair of bumper stays 74 (only one is shown in the figure) for attachment to a vehicle body at the side opposite to its opening, wherein its interior is filled with the core material 73 composed of a foamed resin, the front plate 72 is bridged over the pair of flanges 71a, 71b, and the front plate 72 is tightly joined to the core material 73 and the flange portions 71a and 71b.

In addition, a shock absorbing body 75 composed of a foamed resin is glued to the front face of the front plate 72, the outer portion of which is coated with a coating material 76.

Any one of the multilayer boards for constituting the main beam 71 and the front plate 72 is produced by laminating prepregs and impregnating a resin thereinto, wherein it is receded to use prepregs in which fibers aligned in the longitudinal direction of the bumper and those aligned in a direction perpendicular thereto are alternately laminated using about 18–20 sheets in the case of the main beam 71 or about 8–10 sheets in the case of the front plate 72, into which a polypropylene resin is impregnated.

Figure 13:
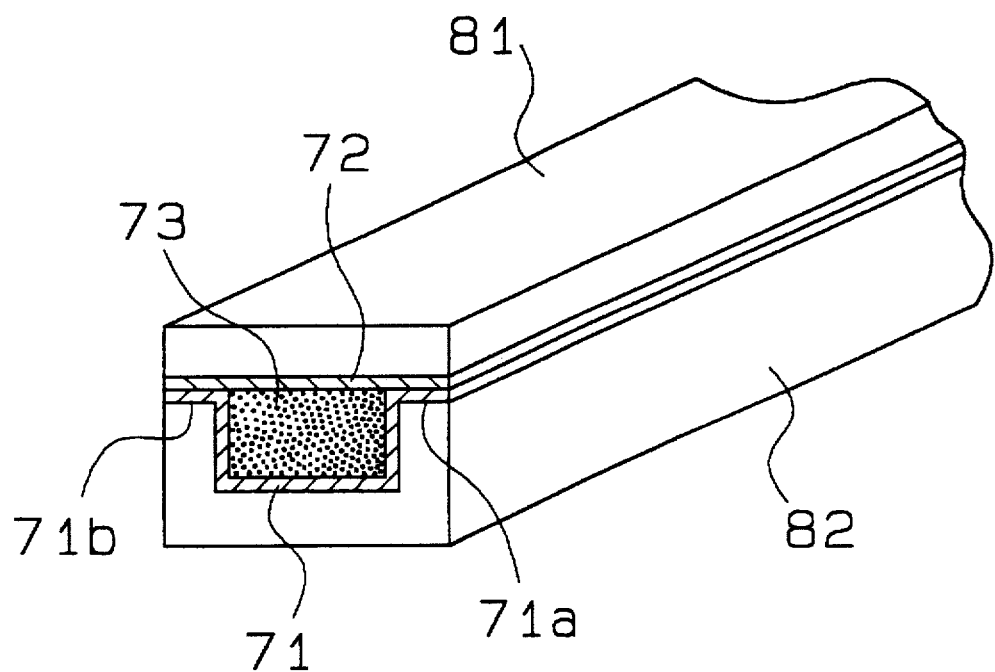
FIG. 13 is an explanatory view showing a method for making a main beam of the bumper beam shown in FIG. 12.

These multilayer boards are cut into suitable sizes, which are previously heated to 210° C., and placed in a mold 81 shown in FIG. 13, so as to firstly mold the main beam 71 by means of a known method. Further, the inside of the groove of the main beam 71 is plugged with the 15-fold foamed body 73 of a polypropylene resin somewhat larger than its volume, on which the front plate 72 is placed.

Any one of the molds 81, 82 is previously heated to 70° C., the contents in the molds are compressed by applying a press pressure of 3 kg/cm² for 1 minute to make mutual adhesion, resulting in the bumper beam.

Incidentally, as an alternative method, the beam may be also produced by a method in which the multilayer boards are wound around the core material 73.

The bumper stays 74 are provided as two individuals with a suitable interval intervening therebetween, so that when a shock acts on the bumper at a portion between the both bumper stays 74, 74, a compressive stress at the outer face side and a tensile stress at the automobile body side are generated at the central portion of the bumper beam 71, however, this bumper is constituted by the prepregs which are flexible but have high resistance force against the tensile stress and the core material which is composed of the foamed resin having a light weight and a high compressive strength, so that the shock can be absorbed.

Figure 14:
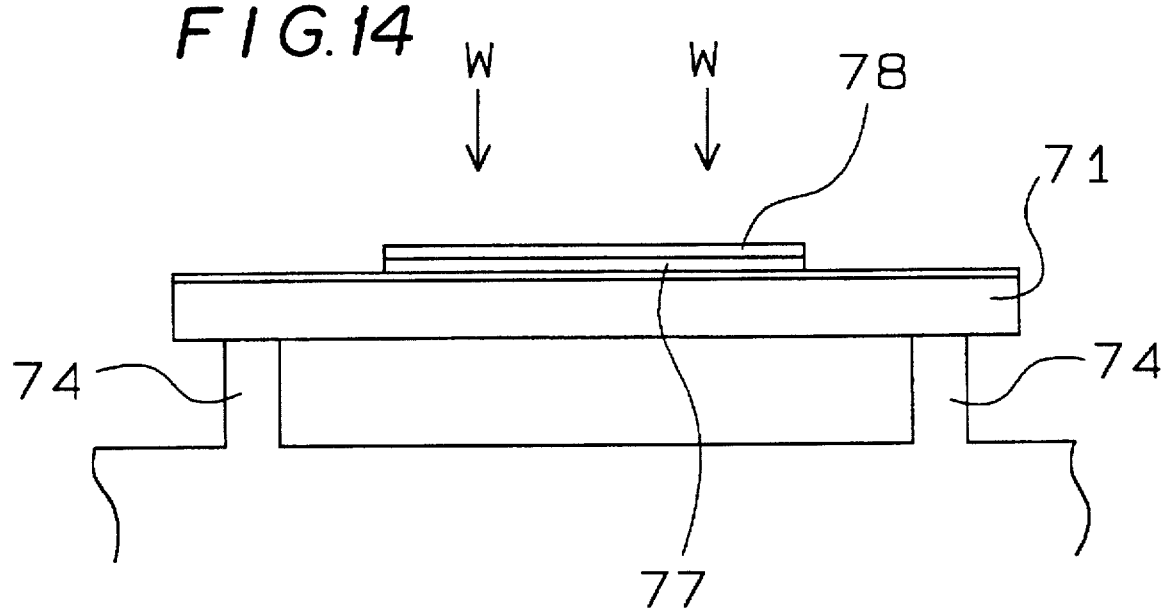
FIG. 14 is an explanatory view showing a test method for the bumper beam.

Using polypropylene resins having 15-fold, 30-fold and 45-fold expansion ratios as the foamed resin of the core material, bumper beams having a length of 1200 mm, a width of 100 mm and a height of 70 mm were produced, and the maximum breaking load was measured using an apparatus shown in FIG. 14.

In addition, for comparison, a test was also performed for a bumper beam having the same shape with no core material.

The interval between the stays of the test apparatus was 1000 mm, the beam was fixed to the stays 74 in accordance with an ordinary method, an iron plate 78 having a height of 20 mm, a width of 120 mm and a length of 500 mm was placed thereon at the central portion via a cushion 77 composed of a foamed resin, and static loads W, W were applied thereon.

The maximum breaking loads were as follows.

| Expansion factor of the core material | Maximum breaking load |
| --- | --- |
| 15-fold | 4900 Kg |
| 30 | 4600 |
| 45 | 2900 |
| no core material | 2700 |

According to the result, it is known that the strength is maintained at a high level when the expansion factor of the resin of the core material is not more than 30-fold, however, in the case of as much as 45-fold, the strength decreases to a degree which is the same as that in the case of no core material.

In addition, when the expansion factor becomes not more than 2-fold, the weight increases, so that not only the cost is expensive, but also there is generated a fear to cause fatigue destruction due to its own inertia during running.

Therefore, it is desirable that the expansion factor of the core material resin is not less than 2-fold and not more than 30-fold.

As the resin to be impregnated into the multilayer boards for the bumper are recommended polypropylene, polystyrene, polyvinyl chloride, polyimide, polyether sulfone, polyether etherketone, acrylonitrile-styrene copolymer resin, maleic anhydride modified polystyrene resin and the like, however, there is no necessarily limitation thereto.

What is claim is:

1. A composite molded article which comprises at least one multilayer board which is prepared by laminating, heating, and pressure-bonding a plurality of prepregs containing thermoplastic polypropylene resin and reinforcement fibers having a volume content of not less than 30% and not more than 85% in a layered configuration wherein each prepreg has the reinforcement fibers arranged in one direction and adjacent prepregs have the reinforcement fibers arranged in different directions, said multilayer board being capable of being deformed into a desired shape at a low pressure when said thermoplastic polypropylene resin is in a melted state, and a thermoplastic foamed polypropylene resin body made from a thermoplastic polypropylene resin of the same type as the multilayer board and having a desired shape, said multilayer board being pressed and joined onto the surface of said thermoplastic foamed polypropylene resin body in the absence of a mechanical fastener or adhesive agent when said multilayer board is heated to not less than a melting temperature of said thermoplastic polypropylene resin.

2. A composite molded article according to claim 1 wherein the reinforcement fiber contained in the multilayer boards is glass fiber.

3. A composite molded article according to claim 1 wherein a decoration material is adhered to the surface of at least one of the multilayer boards.

4. A composite molded article according to claim 2 wherein a decoration material is adhered to the surface of at least one of the multilayer boards.

5. A method for making a composite molded article comprising:

a step in which a foamed polypropylene resin is used to produce a core material having a desired outer shape, a step in which a plurality of prepregs containing thermoplastic polypropylene resin, which is the same type as the polypropylene resin of the core material, and reinforcement fibers in a volume content of not less than 30% and not more than 85% in a layered configuration, are laminated with the direction of the reinforcement fibers in adjacent prepregs being arranged in different directions, and heated to not less than the melting temperature of the thermoplastic polypropylene resin contained therein so as to mutually adhere to prepregs, and air contained inside is removed to produce at least one multilayer board, a step in which the at least one multilayer board is heated to not less than the melting temperature of the thermoplastic polypropylene resin, and is molded and processed into shape adapting to the shape of the core material, a step in which the at least one multilayer board having been molded into the desired shape by said step is arranged in the vicinity of the core material, contacted with desired regions of the core material, and joined to the core material at a low pressure in the absence of a mechanical fastener or adhesive agent, and a step in which the composite molded article constituted by the core material and the at least one multilayer board is cooled.

6. The method according to claim 5 wherein the reinforcement fibers are glass fibers.

7. The method according to claim 5 wherein a decoration material is adhered to the surface of at least one multilayer board.

8. The method according to claim 5 wherein the at least one multilayer board is joined to the core material at a pressure of not more than 3 kg/cm$^2$.

9. The method according to claim 5 wherein the at least one multilayer board is joined to the core material at a pressure of about 0.1 to 1.5 kg/cm$^2$.

10. The method according to claim 5 wherein the foamed polypropylene resin has an expansion factor of 2 to 30.

* * * * *

UNITED STATES PATENT AND TRADEMARK OFFICE
CERTIFICATE OF CORRECTION

PATENT NO. : 5,725,940

DATED : March 10, 1998

INVENTOR(S) : Sakai et al

It is certified that error appears in the above-identified patent and that said Letters Patent is hereby corrected as shown below:

On the title page item [73], the address of the first assignee and add the second assignee's name in Section [73] Assignee:

Mitsui Toatsu Chemicals, Inc., Tokyo, Japan

Aisin Seiki Kabushiki Kaisha, Aichi-ken, Japan

Signed and Sealed this

Eighth Day of December, 1998

Attest:

BRUCE LEHMAN

Attesting Officer

Commissioner of Patents and Trademarks